(12) United States Patent
Ashline (10) Patent No.: US 7,765,623 B2
(45) Date of Patent: *Aug. 3, 2010

(54) HEAD RESTRAINT DEVICE HAVING A SPACER FOR USE WITH A HIGH-PERFORMANCE VEHICLE

(75) Inventor: Trevor P. Ashline, Mooresville, NC (US)

(73) Assignee: Safety Dynamics, LLC, Morresville, NC (US)

( * ) Notice: Subject to any disclaimer, the term of this patent is extended or adjusted under 35 U.S.C. 154(b) by 1077 days.

This patent is subject to a terminal disclaimer.

(21) Appl. No.: 11/131,782

(22) Filed: May 17, 2005

(65) Prior Publication Data

US 2005/0206151 A1 Sep. 22, 2005

Related U.S. Application Data

(63) Continuation-in-part of application No. 10/728,003, filed on Dec. 3, 2003, now Pat. No. 6,931,669, which is a continuation-in-part of application No. 10/660,230, filed on Sep. 9, 2003, now abandoned, and a continuation-in-part of application No. 10/335,341, filed on Dec. 31, 2002, now Pat. No. 6,871,360, and a continuation-in-part of application No. 29/161,634, filed on May 31, 2002, now Pat. No. Des. 522,178, and a continuation-in-part of application No. 09/993,839, filed on Nov. 16, 2001, now Pat. No. 6,499,149, and a continuation-in-part of application No. 09/837,215, filed on Apr. 19, 2001, now abandoned.

(60) Provisional application No. 60/409,085, filed on Sep. 9, 2002.

(51) Int. Cl.
*A42B 7/00* (2006.01)

(52) U.S. Cl. ............................................... 2/421; 2/425
(58) Field of Classification Search .................. None
See application file for complete search history.

(56) References Cited

U.S. PATENT DOCUMENTS

| 3,278,230 | A | * | 10/1966 | Boyce et al. | 297/465 |
|---|---|---|---|---|---|
| 3,499,681 | A | * | 3/1970 | O'Neal et al. | 297/465 |
| 4,923,147 | A | * | 5/1990 | Adams et al. | 244/122 AG |
| 5,715,541 | A | * | 2/1998 | Landau | 2/425 |
| 6,009,566 | A | * | 1/2000 | Hubbard | 2/468 |
| 6,308,345 | B1 | * | 10/2001 | Williams, Jr. | 2/468 |

(Continued)

*Primary Examiner*—Danny Worrell
(74) *Attorney, Agent, or Firm*—Everman Law Firm, PA; Gregory R. Everman (57) ABSTRACT

A restraint device for controlling the head of a driver during a high-performance vehicle collision. The device includes a rigid spacer positioned along the back of the driver, a tether for attaching the spacer to the driver's helmet, and an anchor strap attached at one end to the tether and at the other end to the vehicle's seat belt assembly and/or the driver's legs which serve as an anchor, opposing forward and downward movement of the driver's head during a frontal collision to reduce the likelihood of injury to the driver. During a frontal collision, deceleration forces applied to the driver's head cause the tether and anchor strap to be tensioned. As such, forces are directly transferred through the tether to the anchor strap and, ultimately, to the anchor in order to resist forward movement and downward rotation of the driver's head.

13 Claims, 10 Drawing Sheets

U.S. PATENT DOCUMENTS 6,588,022 B1 * 7/2003 Anders et al. ................ 2/421
6,751,809 B1 * 6/2004 Cooper et al. ................ 2/421
6,810,535 B1 * 11/2004 Moloney ...................... 2/411

* cited by examiner

HEAD RESTRAINT DEVICE HAVING A SPACER FOR USE WITH A HIGH-PERFORMANCE VEHICLE

CROSS REFERENCE TO RELATED APPLICATIONS

This is a continuation-in-part of application Ser. No. 10/728,003, filed Dec. 3, 2003, now U.S. Pat. No. 6,931,669, which is a continuation-in-part of application Ser. No. 10/660,230, filed Sep. 9, 2003, now abandoned, which claims the benefit of U.S. Provisional Application No. 60/409,085, filed Sep. 9, 2002, and application Ser. No. 10/728,003, filed Dec. 3, 2003, now U.S. Pat. No. 6,931,669 is also a continuation-in-part of application Ser. No. 10/335,341, filed Dec. 31, 2002, now U.S. Pat. No. 6,871,360 B1, and is a continuation-in-part of application Ser. No. 29/161,634, filed May 31, 2002, now U.S. Pat. No. D522,178 and is a continuation-in-part of application Ser. No. 09/993,839, filed Nov. 16, 2001, now U.S. Pat. No. 6,499,149 B2, and is a continuation-in-part of application Ser. No. 09/837,215, filed Apr. 19, 2001, now abandoned, each of which is hereby incorporated by reference.

BACKGROUND OF THE INVENTION

1. Field of the Invention

The present invention relates to the field of safety devices for high-performance vehicles and, more specifically, to a restraint device for controlling a driver's head and neck when the driver is subjected to high deceleration forces, such as those forces that may occur during a frontal collision of a high-performance vehicle.

2. Description of the Related Art

Traditionally, drivers of high-performance vehicles have employed a standard five or six point seat belt assembly, in which all of the belts tie into a common buckle, to restrain the driver during a collision. Although the seat belt assembly is effective in constraining the torso of the driver to the seat assembly during a collision, it does not restrain the driver's head or neck. As such, during an impact, particularly a frontal or angular frontal impact, the driver's head may continue forward from the seat assembly then violently rotate downward towards the driver's chest. This uncontrolled movement of the driver's head has resulted in serious injury and death.

Injury may occur by one of the following ways. First, the driver's head may move forward and downward until it strikes against an interior component of the vehicle, such as the steering wheel. Moreover, downward rotation of the driver's head may cause high tension forces to occur in the spine and neck. Where the tension forces are sufficiently high, a basilar skull fracture may occur, a condition in which the base of the skull cracks from the stem. Finally, during recoil, the driver's head may be flung rearward against an interior component of the car, typically the seating assembly.

One proposed approach to reduce these types of injuries was to equip high-performance vehicles with driver-side airbags. However, this approach is problematic in that after the initial impact, the inflated airbag would block the driver's field of vision. Another problem is that the air bags would have to deploy much more quickly, and with more explosive force, than it would have to with conventional vehicles due to the great speeds at which high-performance vehicles are operated.

Other efforts to improve safety for drivers of high-performance vehicles include devices configured to restrain the driver's head and neck during a collision. Three of these devices, sold under the respective marks Hans Device®, Hutchens Device® and R-3™, have been approved for various classes of racing vehicles.

The Hans Device®, described in U.S. Pat. Nos. 6,009,566 and 4,638,510 to Robert P. Hubbard, includes a rigid yoke that is worn around the neck and over the shoulders of a driver and to which a safety helmet is tethered. Unfortunately, due to the bulky and rigid structure of the yoke, the Hans Device® itself may inadvertently become a safety hazard by impeding the driver from exiting the vehicle, particularly during an emergency situation.

With high-performance vehicles, egress is made through the driver-side window frame. However, the stiff and bulky yoke of the Hans Device® may impede the driver from exiting the vehicle by making it more difficult to move and fit through the driver-side window frame. Consequently, valuable time in removing the driver from a dangerous crash site and to treat the driver may be lost. This need to quickly exit the vehicle is particularly critical when the driver and/or vehicle are on fire or when the driver is seriously injured.

Another disadvantage of the Hans Device® is that the driver's seat must be modified in order to accommodate the bulky yoke. Accordingly, the device can not be used in a vehicle until costly modification to the vehicle's seat assembly has been made.

Still another disadvantage of the Hans Device® is that some drivers consider the rigid yoke as being uncomfortable and that the yoke restricts their mobility where operating the vehicle. Moreover, some drivers have also noted that yoke limits their peripheral view. These limitations of the Hans Device® may potentially lead to driver error and hence be the cause of a vehicle crash.

The Hutchens Device®, described in U.S. Pat. No. 6,499,149 to Trevor P. Ashline, comprises a series of straps forming a harness that is worn by a driver. The harness is tethered to the driver's helmet at one end and anchored to either the vehicle's seat belt assembly or, in an alternative configuration, around the driver's legs.

In addition to providing protection to the driver during a collision, the Hutchens Device® overcomes many of the disadvantages of the prior art. For example, Hutchens Device® by being configured of flexible straps, is light-weight and does not significantly interfere with a driver's ability to egress a vehicle. As such, the driver may freely exit the vehicle upon uncoupling the vehicle's seat belt assembly.

Moreover, the Hutchens Device® does not require any modification to the vehicle's seat assembly in order to properly function. Accordingly, the device is ready for use upon purchase and is a safety solution affordable to all drivers.

The R-3™ restraint is the subject of pending application Ser. No. 10/728,003 to Trevor P. Ashline. The R-3™ comprises a rigid member positioned along the driver's back, tethers extending from the top section of the rigid member to a helmet, and straps extending from the bottom section rigid member to the vehicle's seat belt assembly and/or to the driver's body which serves as an anchor to control the driver's head and neck during a vehicle collision. Like the Hutchens Device®, R-3™ is light-weight, does not significantly interfere with a driver's ability to egress a vehicle, requires no modification to the driver's seat assembly prior to use, and allows for a driver to freely exit the vehicle upon the uncoupling the vehicle's seat belt assembly.

Notwithstanding the benefits provided by the Hutchens Device® and R-3™, due to the dangerous nature of operating a high-performance vehicle during the course of racing, there is a continual need for providing improved and/or alternative restraint devices. Such restraint devices should not only provide the benefit of controlling the driver's head during a collision, but should also be simplistic in use and construction, inexpensive, not interfere with a driver's operation of a high-performance vehicle, and not impede the driver's egress from the vehicle.

BRIEF SUMMARY OF THE INVENTION

To achieve the foregoing and other objects, the present invention, as embodied and broadly described herein, provides various embodiments of restraint device for controlling the head of a driver during a collision while operating a high performance vehicle.

In the broadest sense, the invented restraint device includes a spacer, a tether and a strap. The tether is attached to the spacer and is adapted to be attached to a helmet. The strap is attached to the tether and is adapted for being attached to the vehicle's seat belt assembly. The restraint device cooperates with the seat belt assembly such that the seat belt assembly serves as an anchor to control movement of the driver's head during a vehicle collision. Optionally, the strap is attached to the coupling means of the seat belt assembly. And, the driver is freed from being secured to the vehicle by uncoupling the seat belt assembly coupling means.

Also in the broadest sense, the invented restraint device includes a spacer, a tether attached to the spacer and adapted for being attached to a helmet, and a strap attached to the tether and to a driver's legs. The driver's legs serve as an anchor to control movement of the driver's head during a vehicle collision. Optionally, the driver is freed from being secured to the vehicle by merely uncoupling the vehicle's seat belt assembly.

BRIEF DESCRIPTION OF THE DRAWINGS

The above described and other features, aspects, and advantages of the present invention are better understood when the following detailed description of the invention is read with reference to the accompanying drawings, wherein.

DESCRIPTION OF THE PREFERRED EMBODIMENTS

The present invention will now be described more fully hereinafter with reference to the accompanying drawings in which preferred embodiments of the invention are shown. This invention may, however, be embodied in many different forms and should not be considered as limited to the embodiments set forth herein. These exemplary embodiments are provided so that this disclosure will be both thorough and complete, and will fully convey the scope of the invention to those skilled in the art. Like reference numbers refer to like elements throughout the various FIGS. whereas the use of a letter with a like reference number refers to an alternative configuration.

The present invention describes a restraint device that provides protection to a driver's head and neck beyond that offered by just a vehicle's seat belt assembly. During an impact, a standard 5 or 6 point seat belt assembly will limit forward advancement of a driver's torso from the seat assembly. However, the driver's head, unrestrained, is free to continue forward and caused to rotate about the neck thereby placing large tension loads on the spine and neck. Accordingly, the driver's head may continue forward at a high rate until it impacts against the steering wheel or other interior component of the vehicle, injuring the driver. Furthermore, the downward rotation of the head may place such large loads on the spine and neck that a basilar skull fracture may occur, a condition in which the base of the skull cracks from stress and, typically, also causing trauma to arteries and to the spinal cord. Finally, the driver's head may recoil from its forward position and be flung rearwards into the seat assembly or into another interior component of the vehicle.

In various embodiments, the present invention controls the driver's head and neck when the driver is subjected to large deceleration forces that occur during a high-performance vehicle collision. More specifically, the restraint device opposes the deceleration forces in order to inhibit forward movement and downward rotation of the driver's head, thereby decreasing loading to the spine and neck and reducing the likelihood of injury to the driver. By offsetting loading to the driver, the present invention is effective in protecting a driver's head and neck during a frontal or angular frontal collision. The present invention may offer some benefit during pure side or rear impacts to the vehicle, however, it may have less effectiveness. The term "driver" as used throughout this specification is to be construed as being inclusive of any person, particularly those that are an occupant within a vehicle.

In various embodiments, the present invention includes a restraint device having a rigid spacer positioned along a driver's back, at least one tether for attaching the spacer to a helmet, and at least one strap for anchoring the device, each of which are described in greater detail below. As used herein, the term "anchor" includes a driver's body, such as the driver's legs, hips and/or torso, and/or also a component of a vehicle, such as the vehicle's seat belt assembly. In specific embodiments, alternative configurations of the present invention are presented for attaching the device to various anchors.

The term "helmet", as used herein, includes any article wearable on a driver's head. For example, and not to be construed as being limiting, "helmet" includes conventional head protective devices such as racing helmets having a hard exterior shell for protecting a driver's head against impact. Helmet also includes articles that do not have a hardened exterior shell, such as a skullcap, an example of which is sold by Speedway Safety Equipment of Hueytown, Ala.

The term "tether", as used herein, refers to any tether, webbing, strap, dashpot/dashpot containing a controllable rheological fluid such as that disclosed in U.S. patent application Publication No. 2003/0088906 A1 to Gregg S. Baker, belt, cord, chain, cable, rope, band, or the like, that is adapted to attach an embodiment of the invented restraint device to a helmet. Moreover, the term tether includes where the tether is one continuous length having terminal ends available for attaching to a helmet and an intermediate section attached to the anchoring strap, and where the tether is a plurality of tethers, such as the two tethers illustrated in FIGS. 1 and 2. Each tether may be comprised of more than one section. Additionally, the term tether includes a network of webbing (not shown) that wraps over a helmet at one end and attaches to an embodiment of the invented restraint device at the other end. Furthermore, the term tether includes a strap that extends from a skull cap that attaches to an embodiment of the invented device. Still further, the term tether may include only the tether section that attaches to an embodiment of the invented device and/or the entire tethering system.

The tether is attached to the spacer and is capable of being attached to a helmet. The terms "attached", "attaching", "attachable" and "attach", as used herein, includes being, adapted to be, and releasably affixed, coupled, secured, fastened, joined, adjoining and connected. These terms also include when components are slidably coupled together without being affixed together at a specific location (see for example FIG. 1 wherein the tether 14 and spacer 12 are attached even though they may slidably move in relation to each other). A non-exhaustive list of means/methods for attaching include mechanical fasteners, clips, straps, rings, adhesive, hooks, weaving, tying, stitching, encircling, for example.

In the various embodiments, at least one strap is provided for attaching the restraint device to an anchor. The term "strap", as used herein, refers to any strap, webbing, belt, cord, chain, cable, rope, band, or the like. The strap is attached to the tether, to the spacer by weaving the strap through a slot in the spacer, and to an anchor. Specific examples of attaching the strap to the anchor are illustrated in the various embodiments below.

The term "strap" includes at least one strap that is capable of attaching the present invention to an anchor in order to control a driver's head and neck during a vehicle collision. It is to be understood that for each of the embodiments described herein, that a plurality of straps may be used in place of an illustrated single strap. It is also to be understood that the strap may be comprised of a plurality of sections.

Not to be construed as limiting, the strap and tether are preferably made of polyester webbing, having suitable strength and performance characteristics necessary for operating under the load conditions associated with high-performance vehicle racing. Moreover, the strap and tether may be provided with adjustment means, such as for example a webbing slide adjuster, a 3-bar ring, or other article, for adjusting the length of the strap or tether in order to fit and seat the device properly to a driver.

In the various embodiments described herein, the present invention is light-weight, non-bulky, allows considerable freedom of movement and easily carried on a driver, such that the invented device does not significantly inhibit driver ingress and egress from a vehicle. Moreover, the present invention does not block a driver's field of vision and allows for a driver to rotate his head in order to look in the various directions necessary for racing a vehicle. Furthermore, the present invention allows for the driver to be released from being secured to the vehicle by merely unlatching the vehicle's seat belt assembly.

Figure 1:
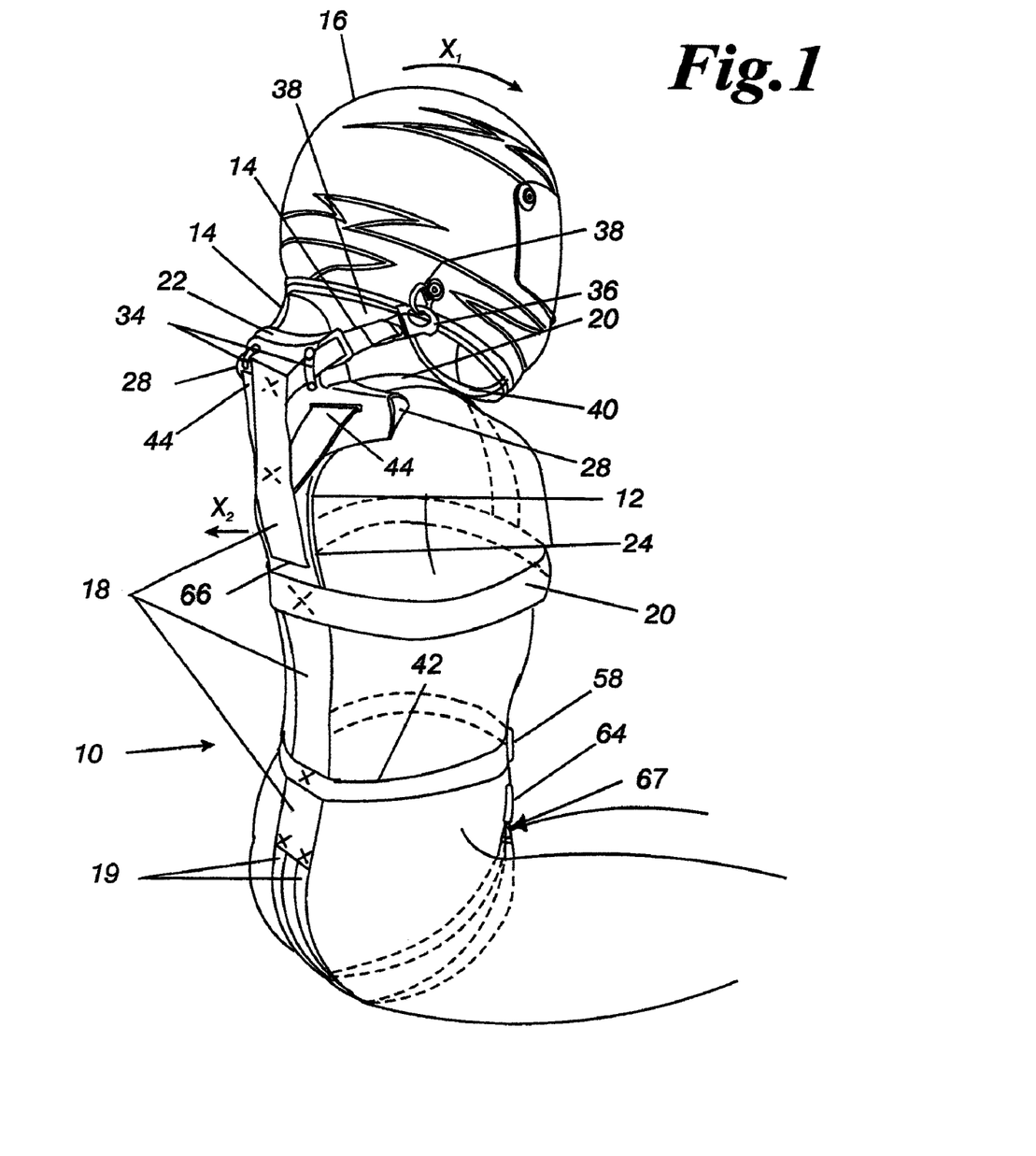
FIG. 1 is a perspective view of the invented restraint device positioned on a driver wherein the device is attached to a helmet and has an anchor strap that extends down the back and between the legs of the driver for anchoring the device to a vehicle's seat belt assembly, in accordance with an exemplary embodiment of the present invention.
Figure 2:
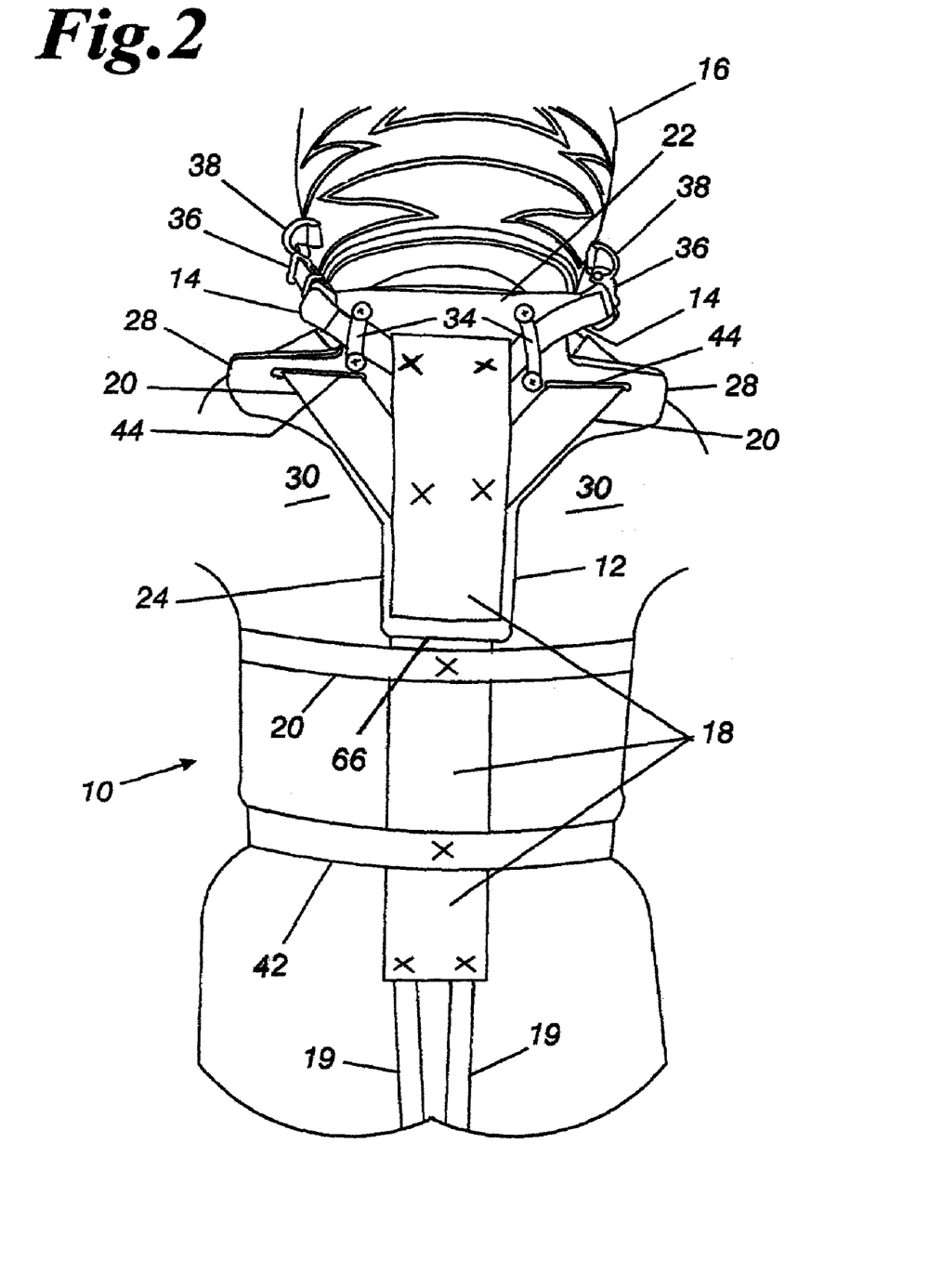
FIG. 2 is a rear view of the restraint device of FIG. 1.
Figure 3:
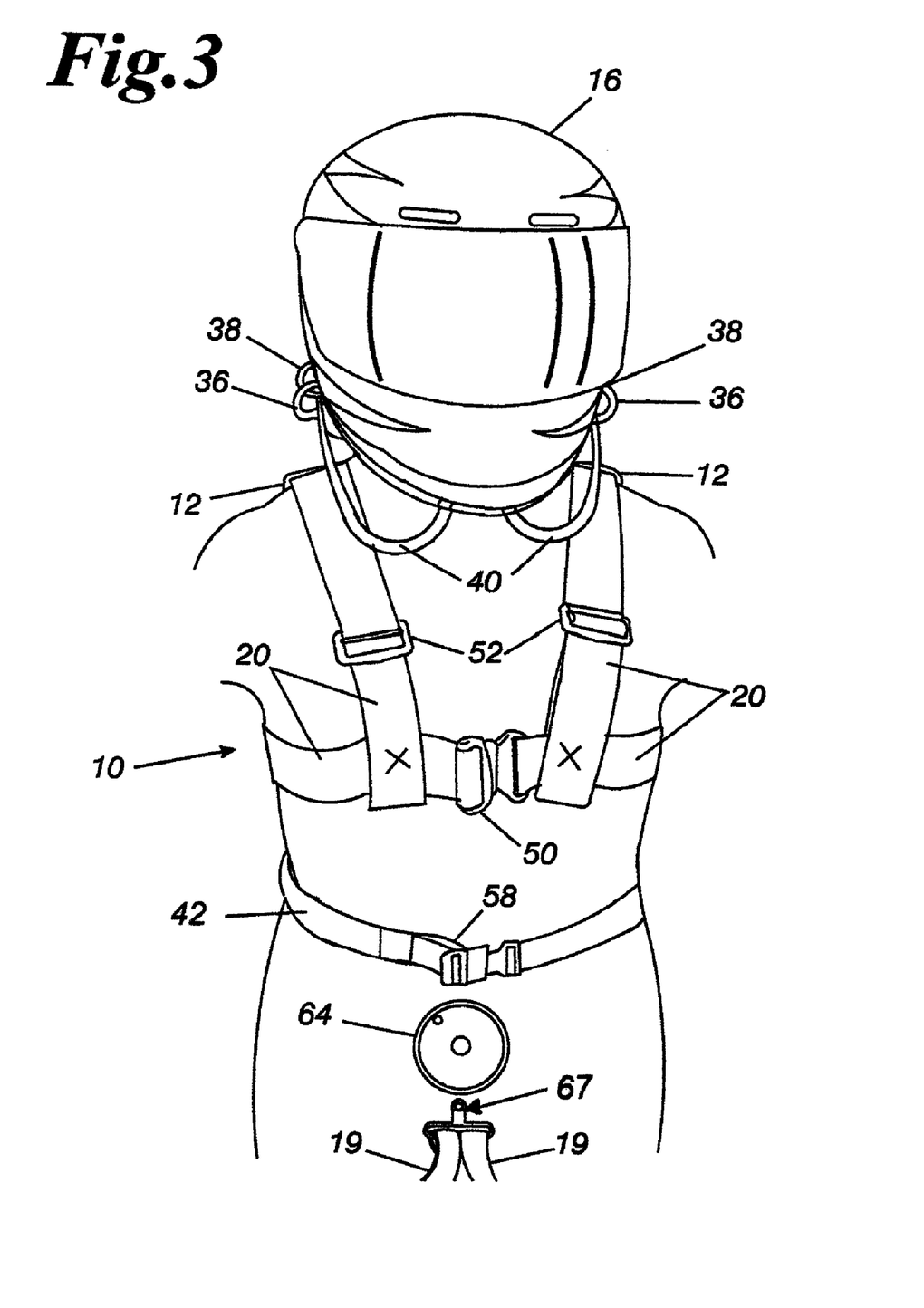
FIG. 3 is a front view of the restraint device of FIG. 1.

Referring to the drawings, and particularly FIGS. 1 and 2, the invented restraint device 10 includes a spacer 12 positionable along a driver's back, at least one tether 14 for attaching the device 10 to a helmet 16, at least one strap 18 for anchoring the device 10, and shoulder straps 20 for holding the device 10 onto the driver during ingress and egress from the vehicle. The spacer 12 functions to properly position the tether 14 and anchor strap 18 in relation to the driver, thereby enhancing control of the driver's head and neck during a collision and facilitating the transfer of resulting forces. The description of the spacer 12 and tether 14, in reference to FIGS. 1-3, are applicable to each of the embodiments disclosed herein, such as those illustrated in FIGS. 5-8.

The length of the spacer 12 may vary. That is, the spacer 12 may have a first section 22 that terminates above the driver's head and a second section 24 that terminates below the driver's gluteus maximus, or have any length there-between. Preferably, the first section 22 terminates at the back of the driver's neck and the second section 24 terminates near the bottom of the driver's shoulder blades. As such, the preferred length of the spacer 12 is between eight and twelve inches, and more typically between nine and eleven inches.

As with the length, the spacer 12 may also be configured with different widths. Although not to be construed as limiting, preferably the width (not including lateral extensions 28) of the spacer 12 is between two and twelve inches and more preferably between three and eight inches. In an exemplary embodiment, the first section 22 is about six inches in the region near the helmet in order to provide suitable placement of the tethers 14 and the second section 24 is about 3½ inches in order to be positioned between the driver's shoulder blades.

The lateral extensions 28 extend a distance along the driver's shoulders in order to provide suitable placement of the shoulder straps 20 and to assist in maintaining the restraint device 10 in position on the driver, particularly during an angular-frontal collision.

Not to be construed as limiting, it is also preferred that the spacer 12 be sized so that it does not cover the driver's shoulder blades 30 (FIG. 2), which may otherwise potentially cause discomfort to the driver while operating the vehicle. As such, the lateral extensions 28 extend along the shoulders, above the shoulder blades, while the spacer 12 is sufficiently narrow so as not to interfere with the shoulder blades as it passes there-between.

Moreover, the inner surface of the spacer 12 may be planar (not shown) or contoured in order to accommodate the driver or the driver's equipment. As an example, the embodiment illustrated in FIG. 1 shows the spacer 12 contoured to accommodate the driver's upper back, shoulders and neck.

The spacer 12 is rigid and has sufficient strength in order to resist force loads during a collision. It is to be understood the term rigid means principally rigid and is inclusive of a minor amount of flexibility as the spacer 12 may exhibit some resiliency due to loads being placed thereon. Notwithstanding, it is preferred that the spacer 12 have minimal or no elasticity in order to better control the driver's head during a collision and to minimize any rebounding effect.

The spacer 12 is preferably constructed of carbon fiber or plastic; light-weight, high-strength materials that have sufficient rigidity. A nonexhaustive list of other materials that may yield a high-strength, rigid construction includes metal, composites and fiberglass. The inner surface of the spacer 12 may be provided with padding, cushion, gel pad, fabric, or the like, in order to comfort the driver from the rigid spacer 12.

For each embodiment of this application, at least one tether 14 is provided for releaseably attaching the restraint device 10 to a helmet. For example (not shown in any FIG.), a single tether may extend from the spacer 12 and attach to one location on the back of the helmet. As another example (not shown) a single tether 14 may include an intermediate section that is attached to the anchor strap 18 while the opposed tether ends are adapted for attachment to the helmet 16. As a further example, two tethers 14 (shown in FIGS. 1 and 2) may be used to attach the device 10 to the helmet 16. Additional tethers (not shown) may be provided in order to couple the restraint device 10 to the helmet 16 at a multitude of locations. A webbing tie, or other means, may be provided on the tether 14 for length adjustment as necessary.

In each embodiment of the application, the location of tether attachment to the helmet 16 is based upon controlling movement of the driver's head during a collision. That is, reactive loads through the tethers 14 oppose forward movement of the driver's head as well as downward rotation of the driver's head. Not to be construed as limiting, it is preferred to attach the tethers 14 to opposed sides in the rear half of the helmet 16. As it will be appreciated by those skilled in the art of safety devices for high-performance vehicles, specific placement of the tethers 14 may vary in accordance with a multitude of factors, such as for example the number of tethers being used and the location at which the tethers are attached to the spacer, however, the principle of resisting forward and downward movement of the driver's head remains the same.

Referring to FIGS. 1 and 2, each tether 14 has a first section that is attached to the anchor strap 18 and an opposed second section that is adapted for being releaseably attached to the helmet 16. A clip 34 may be provided to attach the tether 14 to the spacer 12 in order to position and align the tether 14 relation to the spacer 12 and helmet 16. Preferably, the clip 34 does not affix the tether 14 to the spacer 12, but instead gives positioning to the tether 14 while allowing for forces applied thereto to be directly transferred to the anchor strap 12.

Referring to FIGS. 1 and 2, quick release clips 36 are provided on the tether second section for releaseable attachment to D-rings 38 provided on the helmet 16. This arrangement allows for the restraint device 10 to be quickly released from the helmet 16 by pulling clip lines 40, thereby opening the quick release clips 36 for detachment from the helmet D-rings 38, as illustrated in FIG. 3. It is noted that the clip lines 40 may be taped to the chin portion of the helmet 16, as shown, in order to quickly locate the lines 40 and to avoid the lines from becoming inadvertently entangled in the seat belt assembly and restraint device 10.

Referring to FIG. 2, shoulder and waist straps 20, 42 may be provided in order to assist in holding the device 10 in position on the driver while the driver is standing, entering and exiting the vehicle and during a collision event. The shoulder straps 20 may be attached to the spacer 12 and/or anchor strap 18, providing an area through which the driver may insert his arms. In the preferred embodiment, the shoulder straps 20 extend through slots 44 formed in the spacer 12 which establish the shoulder straps 20 at predetermined positions relative to the spacer 12 and driver. Moreover, the shoulder straps 20 may be releaseably coupled together in front of the driver by complementary tongue and buckle assembly 50, or other suitable means to further secure the restraint device 10 in position on the driver. A webbing tie 52, or other means, may be provided on the shoulder straps 20 for length adjustment as necessary.

The waist strap 56 is attached to the anchor strap 18 and has sufficient length to encircle the driver's mid-section where the ends of the waist strap 42 may be coupled together by complementary tongue and buckle assembly 58 or other suitable means.

Although the shoulder and waist straps 20, 42 are principally utilized to maintain positioning of the restraint device 10, these straps 20, 42 may offer some resistance to deceleration forces acting on the driver during a high deceleration event. Notwithstanding, the principal anchoring is provided by the anchoring strap 18.

Figure 4A:
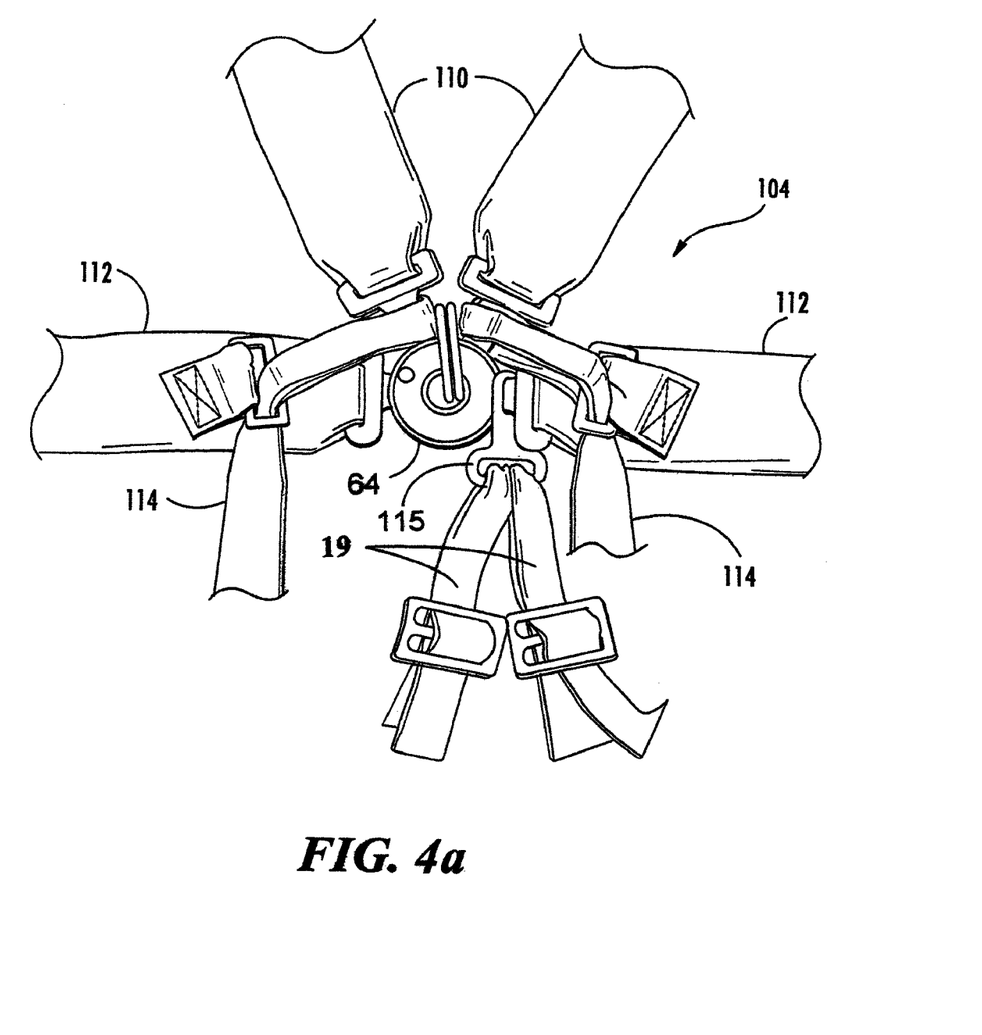
FIG. 4a is a fragmented front view of the restraint device of FIG. 1, showing in particular an arrangement for anchoring the device to the vehicle's seat belt assembly, wherein the anchor strap is secured to the seat belt assembly by a lap belt.
Figure 4B:
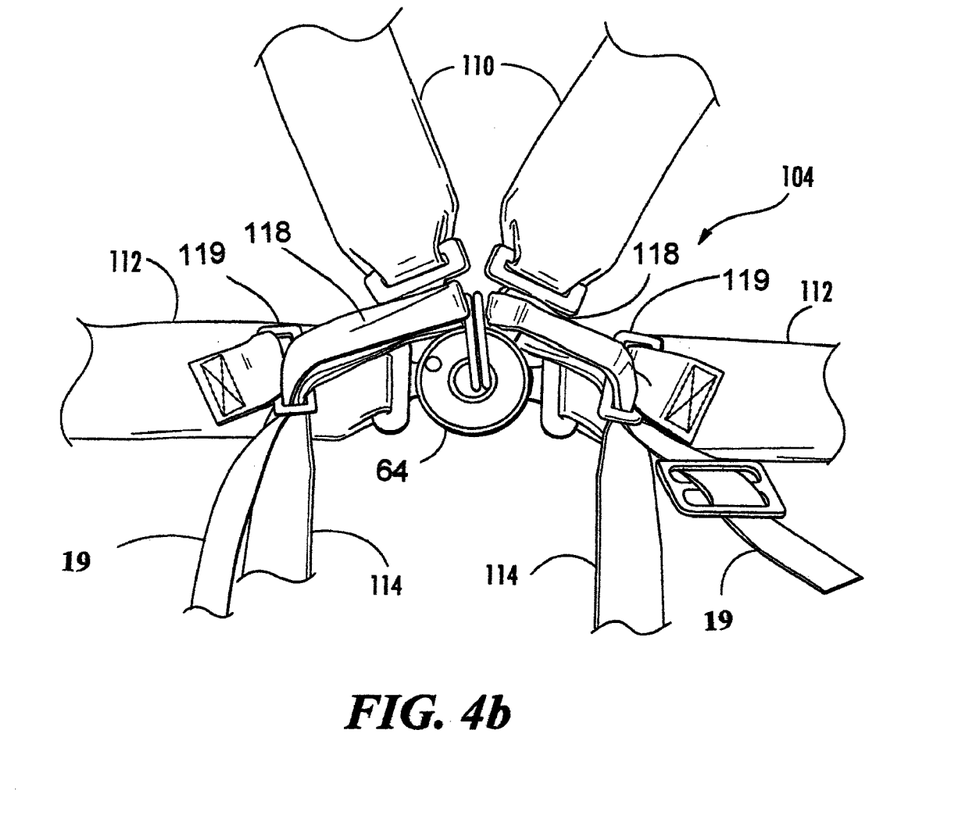
FIG. 4b is a fragmented front view of the restraint device of FIG. 1, showing in particular another arrangement for anchoring the device to a vehicle's seat belt assembly, wherein the anchor strap is secured to the seat belt assembly by shoulder belts.
Figure 4C:
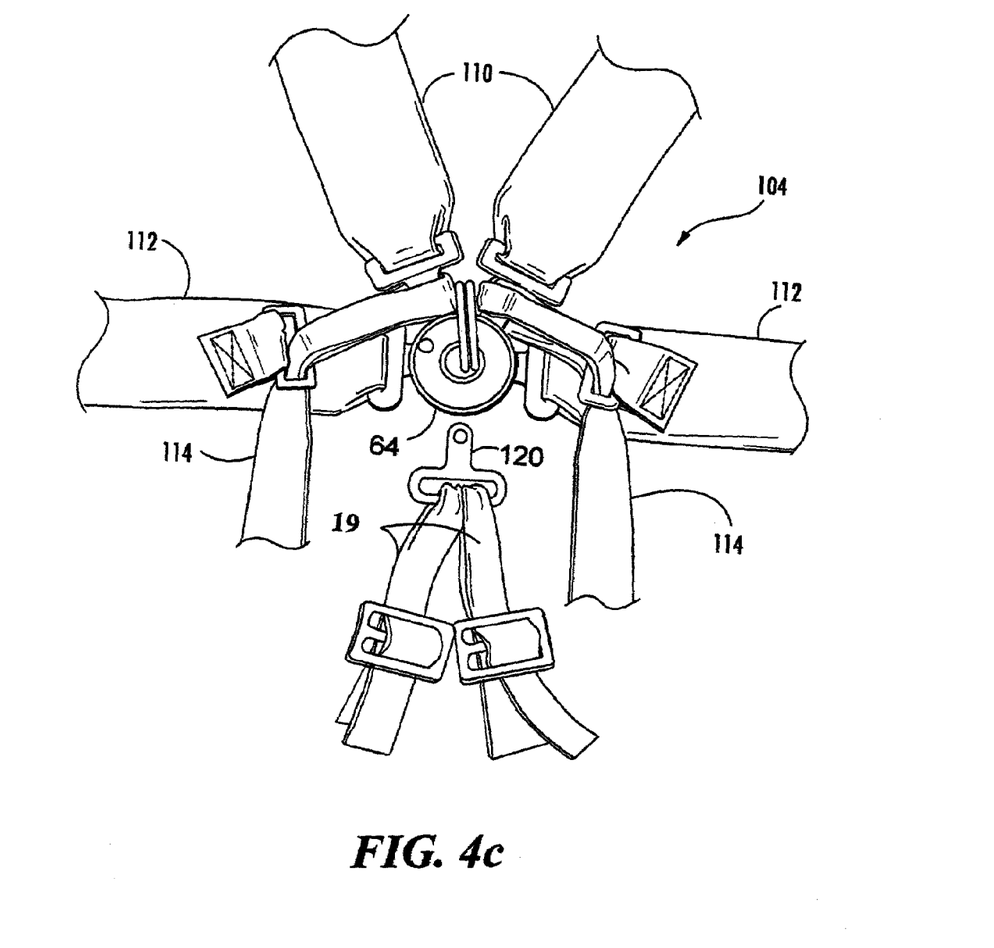
FIG. 4c is a fragmented front view of the restraint device of FIG. 1, showing in particular still another arrangement for anchoring the device to the vehicle's seat belt assembly, wherein the anchor strap is secured to the seat belt assembly by being clipped into a camlock.

The anchor strap 18 illustrated in FIGS. 1 and 2 is configured for anchoring the device 10 to the vehicle's seat belt assembly 104 (FIGS. 4a-4c). The strap 18 has a first section that is attached to the tethers 14, extends longitudinally along the back of the driver (over the outer surface of the spacer 12 and down the small of the driver's back), and a second section that passes between the driver's legs to the seat belt assembly's coupling means 64.

The anchor strap 18 is held in position relative to the spacer 12 and driver principally by being attached to the tethers 14, passing the strap 18 through a slot 66 to the interior surface of the spacer 12, and by coupling to the seat belt assembly. The shoulder and waist straps 20, 42 also contribute to maintaining placement of the anchor strap 18. As it will be appreciated by those skilled in the art of high performance vehicle restraint devices, other means may be used to hold the anchor strap 18 in position relative to the spacer 12 and driver.

The second section for the anchor strap 18 may be bifurcated to allow for the strap 18 to be spaced from the groin as the strap 18 passes between the driver's legs. The strap's second section is provided with suitable means 67 (FIGS. 1 and 3), such as a loop, ring, clip, tongue, or the like, for releaseably attaching to the seat belt assembly 104 (FIGS. 4a-4c). Length adjustment of the strap 18 may be accomplished by a webbing tie, or other suitable means.

FIGS. 4a-4c are exemplary of different ways in which the strap 18 may be attached to the seat belt assembly 104. The illustrated seat belt assembly 104 is a standard five or six point seat belt assembly 104 commonly used in high-performance vehicle racing for securing a driver to the seat assembly and includes a coupling means, such as a cam lock 64, to secure the various belts. It is to be understood that the examples provided herein are not exhaustive and merely illustrative of preferred arrangements and, hence, the teachings are applicable to other seat belt assemblies and to other belt securing mechanisms.

Referring to FIGS. 4a-4c, the seat belt assembly 104 comprises shoulder belts 110, lap belts 112 and sub-belts 114 for securing a driver to the seat assembly 104. Each of the belts 110, 112, 114 has a tongued end for releaseably attaching the respective belt to the cam lock 64.

In the example illustrated by FIG. 4a, the second section of the restraint device anchor strap 19 is attached to a ring 204 through which one of the lap belts 112 may be received. Accordingly, by securing the respective lap belt 112 to the cam lock 64, the strap 19 is also secured to the seat belt assembly 104. An article (not shown) may be provided for spacing the end sections apart in order to ensure comfort to the driver as the strap 19 passes along the groin.

Referring to FIG. 4b, another example is provided wherein the anchor strap 19 has looped ends 118 through which tongues of the shoulder belts 110 may be received. As such, by securing the shoulder belts 110 to the cam lock 64, the strap 19 is also secured to the seat belt assembly 104. The end sections of the strap 19 may be routed through optional D-rings 119 provided on the lap belts 112 in order to space the end sections apart in order to comfort the driver as the strap 19 passes along the groin.

Referring to FIG. 4c, still another example is provided wherein the end sections of the anchor strap 19 are tied to a tongue 120. The tongue 120 may be attached into the cam lock 64 in order to secure the strap 19 to the seat belt assembly 104.

Figure 5:
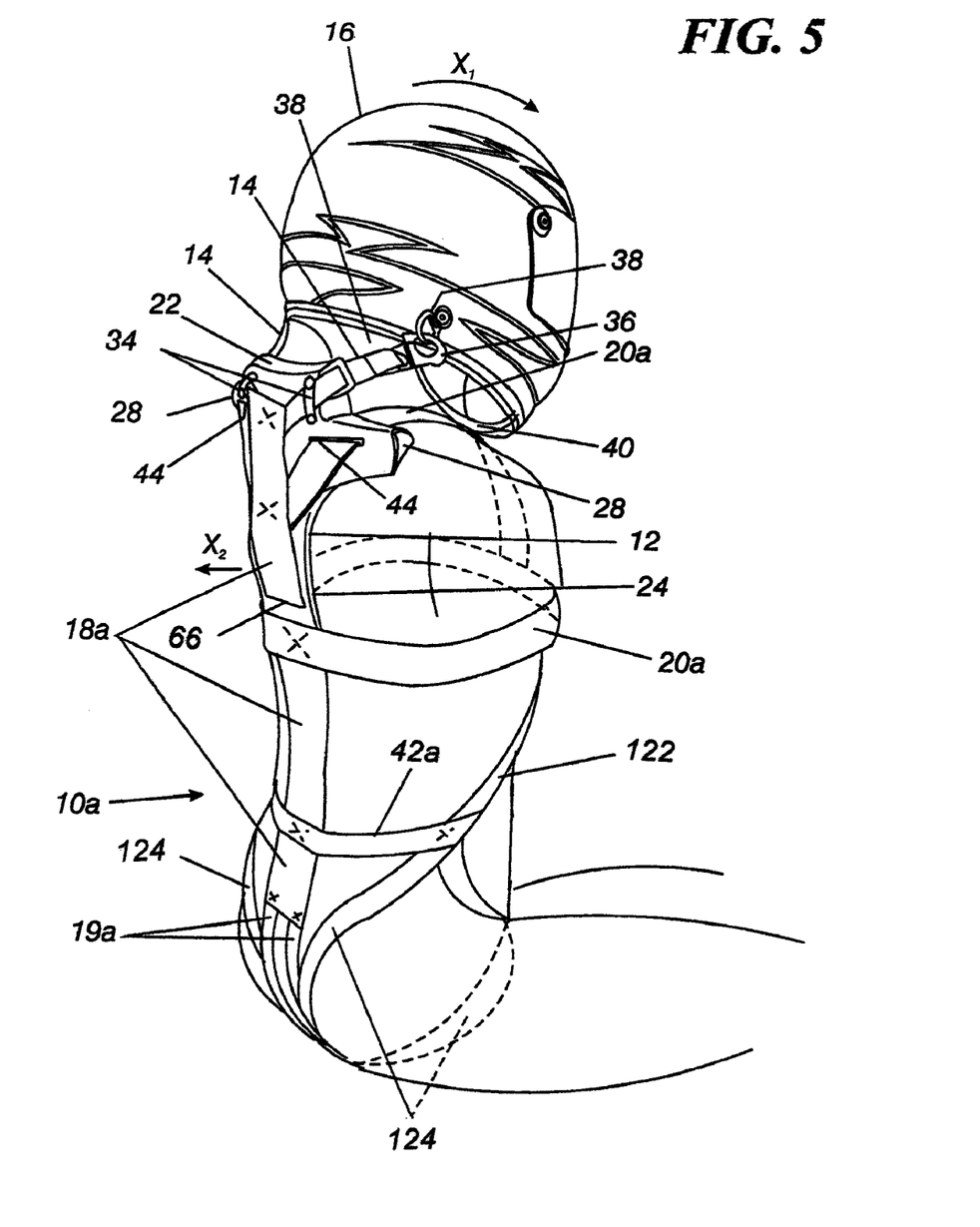
FIG. 5 is a perspective view of an embodiment of the restraint device positioned on a driver wherein the device is attached to a helmet, has an anchor strap that extends down the driver's back and has looped straps for anchoring the device around the driver's legs, in accordance with an exemplary embodiment of the present invention.
Figure 6:
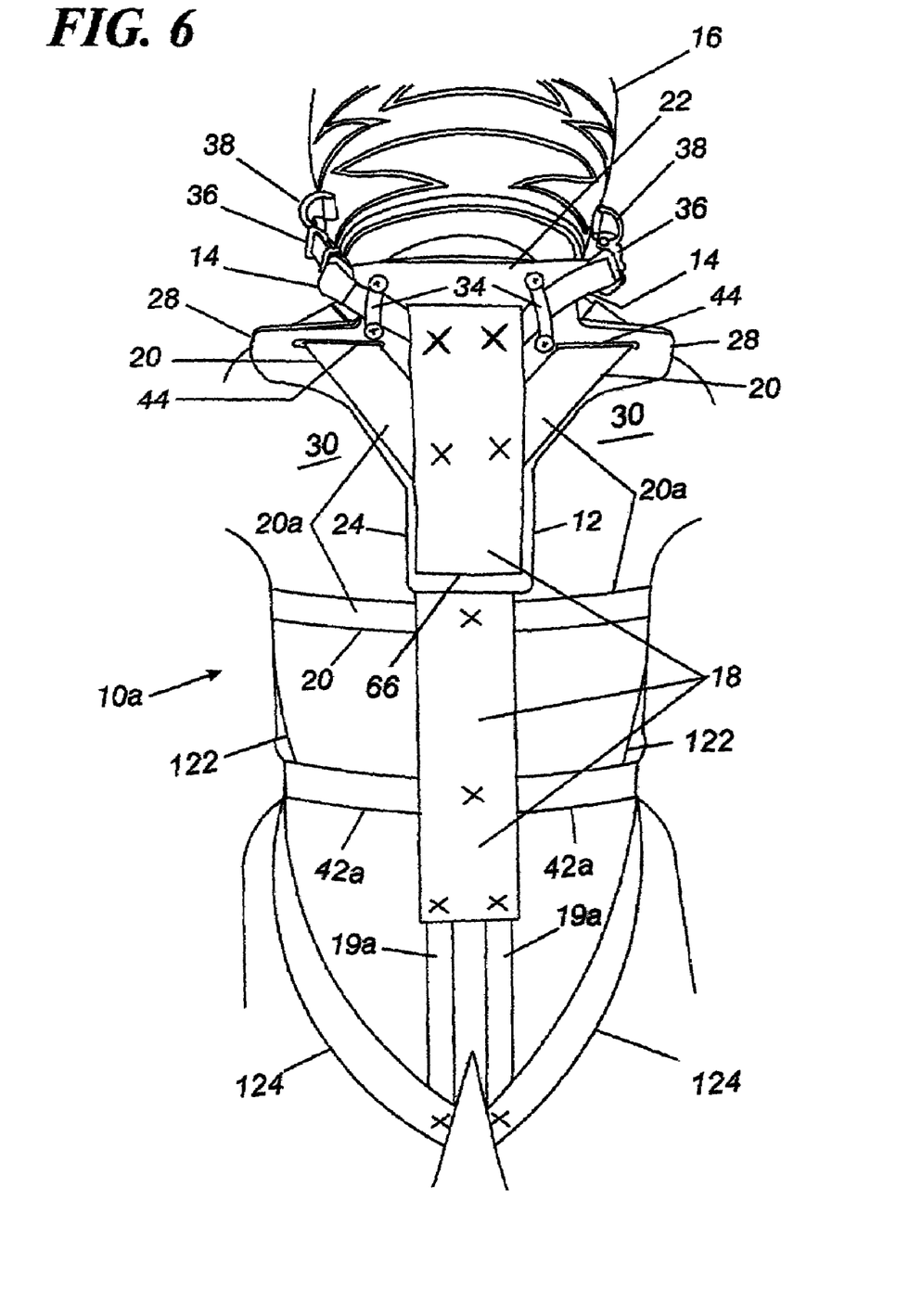
FIG. 6 is a rear view of the restraint device of FIG. 5.
Figure 7:
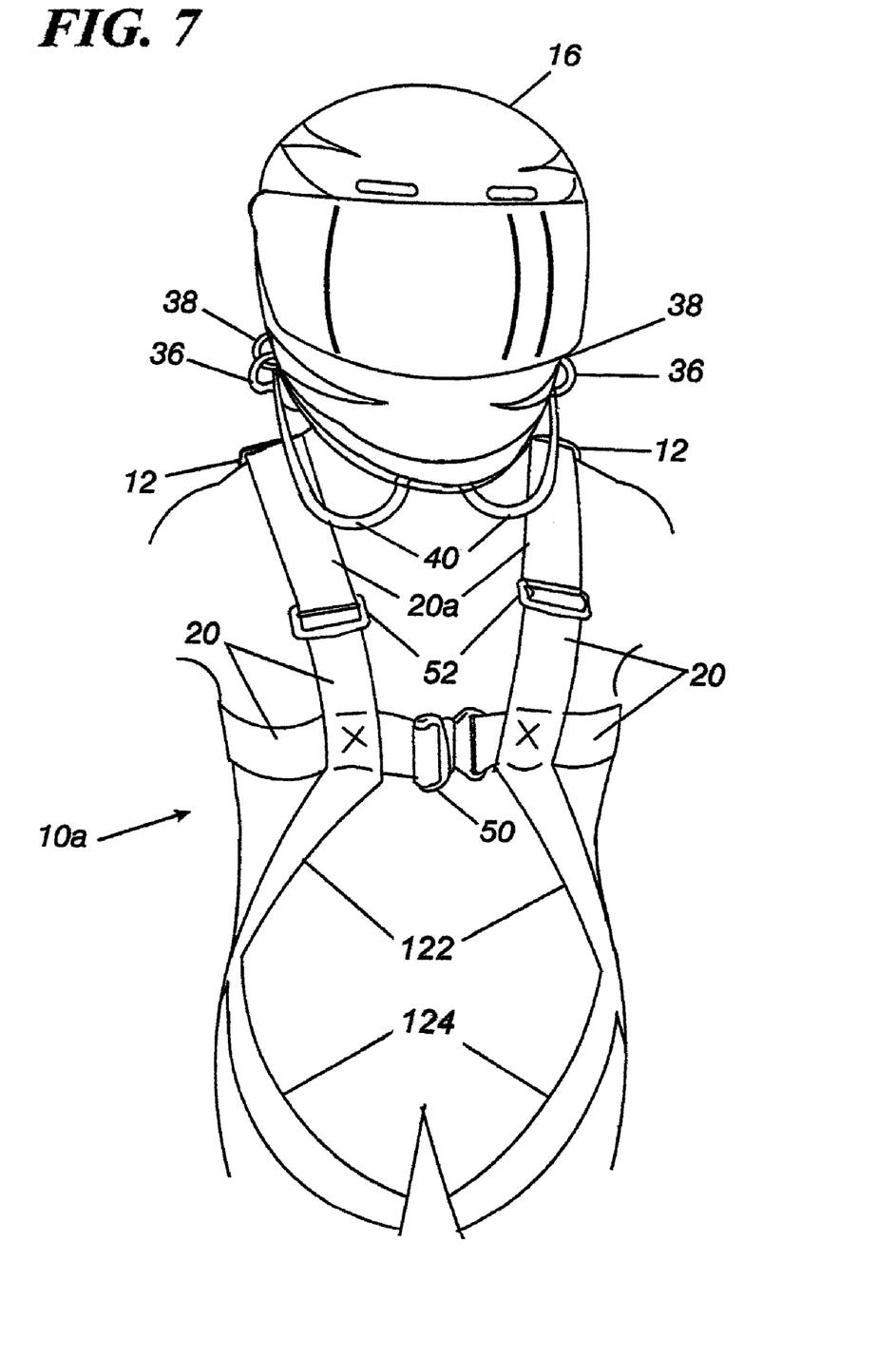
FIG. 7 is a front view of the restraint device of FIG. 5.

Referring to FIGS. 5-7, an embodiment of the restraint device 10a is illustrated wherein the driver's body, particularly the driver's legs, serve as an anchor to resist forward and downward movement of the driver's neck and head during a frontal collision. The device 10a comprises a spacer 12 having lateral extensions 28 and at least one tether 14, each of which are as described above. The shoulder straps 20a are similar in configuration to that as previously described in reference to FIGS. 1-3, but further include strap sections 122 that attach the shoulder straps 20a to leg straps 124 which encircle the driver's legs for anchoring the device 10a. Additionally, the first section of the anchor strap 18a is as previously described in reference to FIGS. 1-3. However, the strap's second section includes looped leg straps 124 that encircle the driver's legs, instead of attaching to the vehicle's seat belt assembly. The illustrated waist strap 42a is principally used for maintaining placement of the anchor strap 18a and leg straps 124 and, as such, extends only along the back instead of fully encircling the driver's waist.

Each looped section 124 encircles respective legs of the driver. Preferably, means are provided for allowing the looped sections 124 to be tightened and/or releaseably coupled around the driver's legs. For example, the each leg strap 124 may be secured and tightened to the driver's legs by a complementary tongue and buckle assembly.

The location at which the leg straps encircle the driver's legs may vary. For example, FIGS. 5-7 illustrate looped sections 124 that are positioned high on the driver's hips, along the hamstring-gluteus maximus interface, along the inner thigh, then over the upper thigh and completing the loop at the driver's hips. As another example (not shown), the looped sections 124 may be positioned lower on the driver such that the leg straps are essentially positioned around the upper portion of the driver's legs without encompassing the hip area. As used herein, the phrases "encircles the driver's legs", "wherein the anchor is the driver's legs" and the like, include the positioning of the leg straps 124 as described and illustrated in the reference to FIGS. 5-7.

Figure 8:
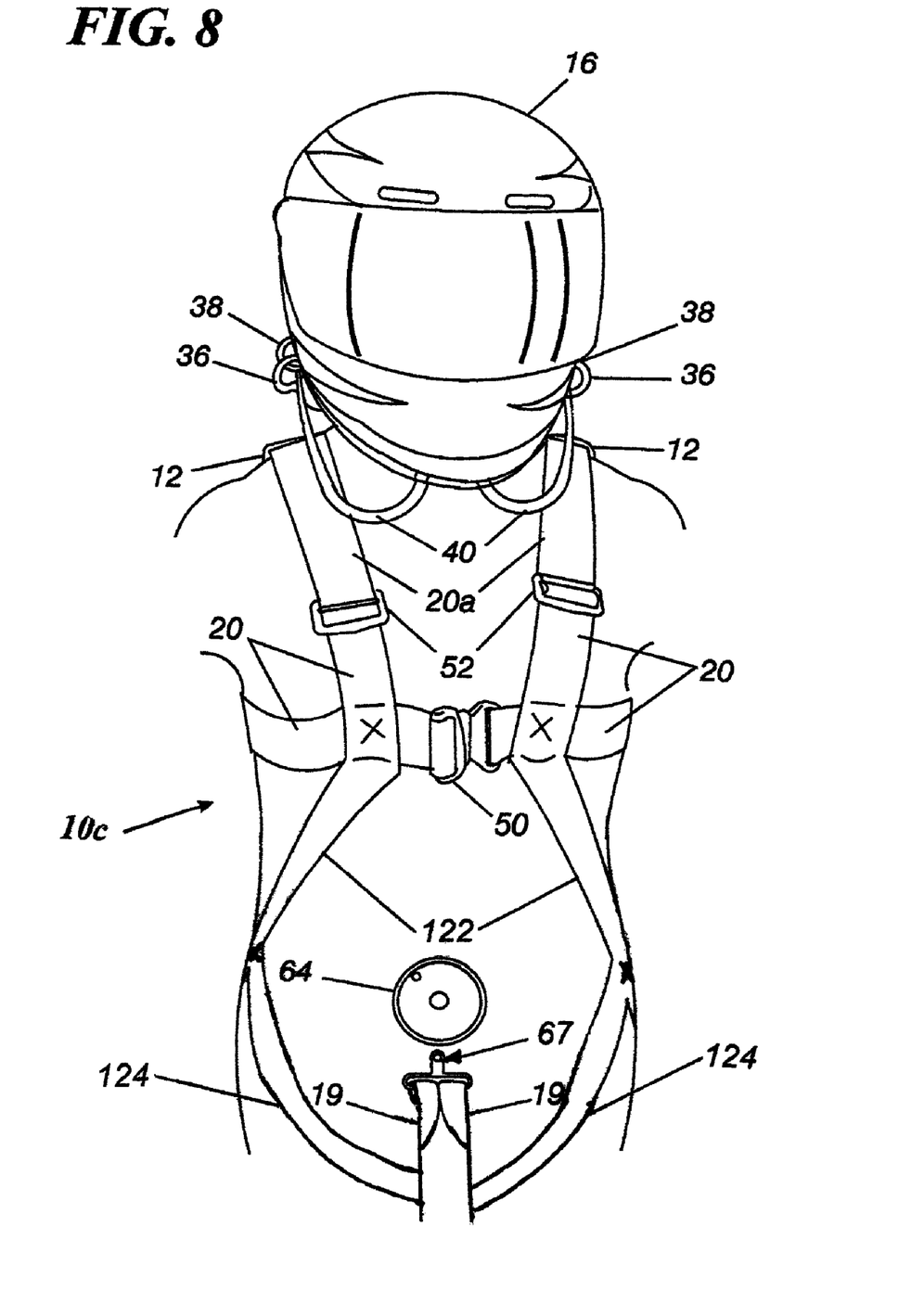
FIG. 8 is a rear view of an embodiment of the restraint device positioned on a driver wherein the device is attached to a helmet, has a strap that extends down the driver's back for anchoring the device to a vehicle's seat belt assembly, and has looped straps for anchoring the device around the driver's legs, in accordance with an exemplary embodiment of the present invention.

Referring to FIG. 8, an embodiment of the restraint device 10b is illustrated showing that any of the above embodiments may be combined so that the seat belt assembly 104 (FIGS. 4a-4c) and the driver's legs are simultaneous being used to provide anchorage. In the illustrated embodiment, the device 10c is the same as described in reference to FIGS. 5-7 except that the anchor strap 18 (see FIGS. 5-7) not only has looped section 124 but attaches to the vehicle's seat belt assembly 104 via anchor strap's second section 19 (see FIGS. 1-4c).

Any of the previous embodiments of the restraint device may be integrated into a racing vest or suit. The vest allows for the restraint device to be easily carried on the driver and may accommodate additional safety equipment such as padding or shielding against impact to the driver's kidneys. A suitable racing vest is described in U.S. patent application Ser. No. 10/728,003 to Trevor P. Ashline, which is incorporated herein by reference.

Also, any of the embodiments described herein may be releaseably carried by the driver's seat by Velcro® so that the device may remain in position for use in the vehicle while the driver enters or exits the vehicle. Once inside the vehicle, the driver attaches the device to the helmet and to the anchor. If a frontal collision were to occur, the device would release from the seat and be carried forward on the driver where it functions to control movement of the driver's head and neck. Examples of means for releaseably attaching the restraint device to the driver's seat are described in U.S. patent application Ser. No. 10/728,003 to Trevor P. Ashline, now U.S. Pat. No. 6,931,669.

In use, and referring to FIG. 1, the restraint device 10 is positioned on the driver, with the spacer 12 disposed along the back of the driver, the tethers 14 attached to the helmet 16, and the strap 18 attached to the tether 14 and anchor, which in this embodiment is the vehicle's seat belt assembly 104. The restraint device 10 is then seated to the driver by adjusting the tethers 14 and/or straps, as necessary. The seat belt assembly 104 is latched, securing the driver to the seat assembly.

In this secured position, the tethers 14 has have enough slack so that the driver may sufficiently pivot his head for range of vision and to operate the vehicle. Not to be construed as limiting, preferably about one inch of slack is provided before the tethers 14 are caused to be placed in tension. This inch of slack correlates to a head rotation of about twenty degree in both directions, that is sufficient for the driver to fully use the vehicle's mirrors. In the case of using a dashpot, slack may not be necessary as the driver remains free to move his head during normal driving conditions, but upon a collision the dashpot will become fixed in length in order to restrain the driver's head.

Upon a collision, particularly a frontal or angular frontal collision, the driver's body initially continues forward, relative to the seat assembly, as the belts of seat belt assembly stretch against the load and restrain continued forward movement of the driver's torso. Meanwhile, the restraint device 10 is carried forward on the driver. As the seat belt assembly slows and stops of the driver's body, the driver's head continues forward and downwards a short distance (in the direction of $X_1$) before slack in the tethers 14 is taken up. The tethers 14, once in tension, opposes continued forward movement and downward rotation of the driver's head by transferring loads principally through the anchor strap 18 to the anchor. Additionally, as the tension in the tethers 14 increases, the first section of the spacer 12 is caused to rock forward (in the direction of $X_1$) thereby forcing the spacer second section to move outward from the driver's body (in the direction of $X_2$). This cam-like action causes the straps, including the anchor strap 18 to tension quicker, providing an increased response in opposing forward and downward movement of the driver's head.

In this manner, the rate of forward and downward movement of the driver's head is slowed and more controlled in comparison to a frontal collision occurrence without use of the restraint device 10. Accordingly, by controlling the driver's head, the likelihood of injury to the driver is decreased.

As it will be appreciated by those skilled in the art of high-performance vehicle safety devices, by having the tethers 14 and anchor strap 18 attached, tension forces in the tethers 14 are directly and principally transferred through the anchor strap 18 to the anchor. Accordingly, the spacer 12 is affected only by a small portion of the total load being opposed by the restraint device 10. And, thus, the spacer may be small in size, as previously set-forth, and need not have the same structural characteristics as would be necessary if the full load was being presented through the spacer 12. Hence, comfort to the driver is ensured and manufacturing complications are reduced.

As it will be also appreciated by those skilled in the art of high-performance vehicle safety devices, the various embodiments described herein each function in this manner. That is, forward movement and downward rotation of the driver's head is opposed by transferring loads through the tether 14 to the anchor strap 18 to the anchor (for example, the driver's legs and/or seat belt assembly). With regards to the embodiment(s) illustrated and described in reference to FIG. 5-7, utilizing the driver's legs as anchors advantageously provides driver's with an option for head and neck protection that would otherwise be unavailable in vehicles, such as go-carts, that do not have a seat belt assembly.

For each embodiment herein, advantageously, if a collision does occur, no additional acts by the driver or racing crew are required in order for the driver to egress the vehicle beyond that necessary by a driver not wearing the restraint device. That is, whether the restraint device is anchored to the driver or to the seat belt assembly, the driver and the restraint device are freed from being secured to the vehicle by merely unlatching the seat belt assembly and, thereafter, may egress the vehicle in a conventional manner. If greater freedom of head movement is desired in order to ease the driver's egress from the vehicle, such as when the driver is severely injured and needs assistance, the tethers may be quickly released from the helmet by simply pulling the clip lines.

That which is claimed is:

1. A restraint device for controlling a driver's head during a vehicle collision, comprising:
    a spacer;
    a tether attached to said spacer and adapted for being attached to a helmet;
    a strap attached to said tether and adapted for being attached to a vehicle's seat belt assembly;
    wherein the seat belt assembly serves as an anchor to control movement of the driver's head during a vehicle collision when said strap is attached to the seat belt assembly; and
    wherein at least a portion of said strap is positioned between the driver's legs when the restraint device is in place on the driver.

2. The restraint device in accordance with claim 1 wherein tension forces applied to said tether are directly transferred to said strap.

3. A restraint device for controlling a driver's head during a vehicle collision, comprising:
    a spacer;
    a tether attached to said spacer and adapted for being attached to a helmet;
    a strap attached to said tether and adapted for being attached to a vehicle's seat belt assembly;
    wherein the seat belt assembly serves as an anchor to control movement of the driver's head during a vehicle collision when said strap is attached to the seat belt assembly;
    wherein the seat belt assembly includes a coupling means and said strap is adapted to be attached at said coupling means; and
    wherein said coupling means is a cam lock.

4. A restraint device for controlling a driver's head during a vehicle collision, comprising:
    a spacer;
    a tether attached to said spacer and adapted for being attached to a helmet;
    a strap attached to said tether and adapted for being attached to a vehicle's seat belt assembly;
    wherein the seat belt assembly serves as an anchor to control movement of the driver's head during a vehicle collision when said strap is attached to the seat belt assembly;
    wherein the seat belt assembly includes a coupling means and said strap is adapted to be attached at said coupling means; and
    wherein the driver is freed from being secured to the vehicle by uncoupling said coupling means.

5. A restraint device for controlling a driver's head during a vehicle collision, comprising:
    a spacer;
    a tether attached to said spacer and adapted for being attached to a helmet;
    a strap attached to said tether and adapted for being attached to a vehicle's seat belt assembly;
    wherein the seat belt assembly serves as an anchor to control movement of the driver's head during a vehicle collision when said strap is attached to the seat belt assembly; and
    wherein the seat belt assembly includes a lap belt and said strap is adapted to be attached to the seat belt assembly by the lap belt.

6. The restraint device in accordance with claim 5 wherein said restraint device and the driver are freed from being secured to the vehicle by uncoupling the lap belt.

7. The restraint device in accordance with claim 1 wherein the seat belt assembly includes a shoulder belt and said strap is adapted to be attached to the seat belt assembly by the shoulder belt.

8. The restraint device in accordance with claim 7 wherein said restraint device and the driver are freed from being secured to the vehicle by uncoupling the shoulder belt.

9. The restraint device in accordance with claim 3 wherein said restraint device and the driver are freed from being secured to the vehicle by releasing said strap from said cam lock and wherein said driver may egress from the vehicle while said restraint device is attached to and being carried on the driver.

10. A restraint device for controlling a driver's head during a vehicle collision, comprising:
    a spacer;
    a tether attached to said spacer and adapted for being attached to a helmet;
    a strap attached to said tether and adapted for being attached to a part of the driver's body;
    wherein tension forces applied to said tether are directly transferred to said strap;
    wherein the driver's body serves as an anchor to control movement of the driver's head during a vehicle collision when said device is being worn by the driver; and
    wherein the part of the driver's body to which said strap is attached and which serves as an anchor is the driver's legs.

11. The restraint device in accordance with claim 10 wherein said restraint device is not attached to a vehicle's seat belt assembly and wherein the driver and the restraint device are freed from being secured to the vehicle by uncoupling the seat belt assembly.

12. The restraint device in accordance with claim 10 wherein said restraint device is attached only to the driver's body and helmet.

13. The restraint device in accordance with claim 10 wherein said restraint device is adapted for being attached to a vehicle's seat belt assembly by said strap, wherein the seat belt assembly anchors the driver's head to control movement of the driver's head during a vehicle collision when said strap is attached to the seat belt assembly, and wherein the driver and the restraint device are freed from being secured to the vehicle by uncoupling the seat belt assembly.

* * * * *